United States Patent
Nagatoshi et al.

(10) Patent No.: US 9,740,135 B2
(45) Date of Patent: Aug. 22, 2017

(54) OPTICAL SCANNING DEVICE

(71) Applicant: CANON KABUSHIKI KAISHA, Tokyo (JP)

(72) Inventors: Jun Nagatoshi, Tokyo (JP); Mitsuhiro Ohta, Yokohama (JP); Shunsuke Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/043,322

(22) Filed: Feb. 12, 2016

(65) Prior Publication Data
US 2016/0238965 A1 Aug. 18, 2016

(30) Foreign Application Priority Data

Feb. 17, 2015 (JP) .................................. 2015-028944
Feb. 17, 2015 (JP) .................................. 2015-028945

(51) Int. Cl.
*G03G 15/04* (2006.01)
*G02B 26/10* (2006.01)

(52) U.S. Cl.
CPC ....... *G03G 15/04036* (2013.01); *G02B 26/10* (2013.01); *G03G 15/04072* (2013.01)

(58) Field of Classification Search
CPC ....... G03G 15/04036; G03G 15/04072; G03G 15/043; G03G 15/0435; G02B 26/10; G02B 26/127
See application file for complete search history.

(56) References Cited

U.S. PATENT DOCUMENTS

| | | | | |
|---|---|---|---|---|
| 6,194,713 B1 * | 2/2001 | Kanazawa | ............ | G02B 26/12 250/234 |
| 2003/0173508 A1 * | 9/2003 | Tanaka | ................. | G02B 26/124 250/234 |
| 2010/0183337 A1 * | 7/2010 | Kubo | ........................ | B41J 2/45 399/220 |
| 2013/0033557 A1 * | 2/2013 | Lim | ..................... | G02B 26/127 347/224 |
| 2013/0222513 A1 * | 8/2013 | Nakano | ............... | G02B 26/127 347/250 |
| 2014/0158874 A1 * | 6/2014 | Kusuda | ................. | G02B 26/10 250/234 |

FOREIGN PATENT DOCUMENTS

| | | |
|---|---|---|
| JP | H11305152 A | 11/1999 |
| JP | 2007156150 A | 6/2007 |
| JP | 2007171648 A | 7/2007 |
| JP | 4109878 B2 | 7/2008 |
| JP | 2008257158 A | 10/2008 |
| JP | 2014-115371 A | 6/2014 |
| JP | 2015-026020 A | 2/2015 |

* cited by examiner

*Primary Examiner* — David M Gray
*Assistant Examiner* — Carla Therrien
(74) *Attorney, Agent, or Firm* — Canon USA, Inc. I.P. Division (57) ABSTRACT

In one embodiment, an optical scanning device includes a board and a light receiving member, the positional accuracy of which is improved. When a length in a scanning direction and a length in an intersection direction of a body portion of the light receiving member are denoted by Lx0 and Ly0, respectively, and a length in the scanning direction and a length in the intersection direction of a through-hole formed in the board are denoted by Lx1 and Ly1, respectively, the lengths Lx0, Ly0, Lx1, and Ly1 satisfy the following formula:

$$(Lx1-Lx0)>(Ly1-Ly0).$$

8 Claims, 11 Drawing Sheets

OPTICAL SCANNING DEVICE

BACKGROUND OF THE INVENTION

Field of the Invention

Aspects of the present invention generally relate to an optical scanning device equipped with a plurality of optical-system components including a light deflector, which deflects a light beam, and a detection unit, which detects timing at which a light beam passes.

Description of the Related Art

An optical scanning device, which is used for an image forming apparatus, such as a laser printer, uses a light deflector, which is composed of, for example, a rotary polygonal mirror, to perform deflection scanning with a laser light beam emitted from a light source according to an image signal. The laser light beam subjected to deflection scanning is led to a beam detection (BD) sensor (a beam detector), which serves as a light detection unit (a light receiving element), so as to control timing of the scanning start position on a surface to be scanned. The laser light beam is moved while being focused in a spot shape on a photosensitive recording medium by an imaging optical system (a scanning lens) having an fθ characteristic. The writing start timing of optical scanning is a predetermined time after the BD sensor outputs a synchronization signal.

Japanese Patent No. 4109878 discusses a configuration in which the above-mentioned BD sensor is mounted on a circuit board.

In the configuration discussed in Japanese Patent No. 4109878, the BD sensor, serving as an element, is mounted on the circuit board from a surface (first surface) of the circuit board on the side at which to receive a laser light beam. Then, the BD sensor receives a laser light beam through a through-hole provided in an optical box to which the circuit board is fixed. In recent years, it has been considered that, to reduce an apparatus size and lower costs, the BD sensor, serving as a light receiving member, is mounted on the circuit board from a surface (second surface) of the circuit board opposite to the first surface.

SUMMARY OF THE INVENTION

Aspects of the present invention are generally directed to improving the positional accuracy at which to mount a light receiving member on a circuit board from the second surface thereof.

According to an aspect of the present invention, an optical scanning device includes a light source, a deflection unit configured to deflect a light beam emitted from the light source, a board, and a light receiving member including a body portion, which includes a light receiving portion, and a first terminal portion and a second terminal portion, each of which is soldered to the board, wherein the light receiving portion receives the light beam deflected by the deflection unit and moving in a scanning direction, wherein the first terminal portion and the second terminal portion are located opposite each other across the body portion in an intersection direction that intersects with the scanning direction as viewed in a normal direction to a mounting surface of the board, wherein the board has a through-hole formed thereon, into which at least a part of the body portion is inserted, and includes a first soldering portion soldered to the first terminal portion and a second soldering portion soldered to the second terminal portion, the first soldering portion and the second soldering portion being located opposite each other across the through-hole in the intersection direction, and wherein, when a length in the scanning direction and a length in the intersection direction of the body portion are denoted by $Lx0$ and $Ly0$, respectively, and a length in the scanning direction and a length in the intersection direction of the through-hole are denoted by $Lx1$ and $Ly1$, respectively, the lengths $Lx0$, $Ly0$, $Lx1$, and $Ly1$ satisfy the following formula:

$$(Lx1-Lx0)>(Ly1-Ly0).$$

According to another aspect of the present invention, an optical scanning device includes a light source, a deflection unit configured to deflect a light beam emitted from the light source, a board having a through-hole formed thereon, and a light receiving member including a light receiving portion and mounted on the board, wherein the light receiving member receives the light beam that has entered the through-hole while being deflected by the deflection unit and moving in a scanning direction, and wherein the light receiving portion is located in a position which is downstream of the center of the light receiving member with respect to the scanning direction and which allows no light beam reflected from an inner wall of the through-hole to be incident on the light receiving portion.

Further features of the present invention will become apparent from the following description of exemplary embodiments with reference to the attached drawings.

DESCRIPTION OF THE EMBODIMENTS

[Image Forming Apparatus]

Figure 1:
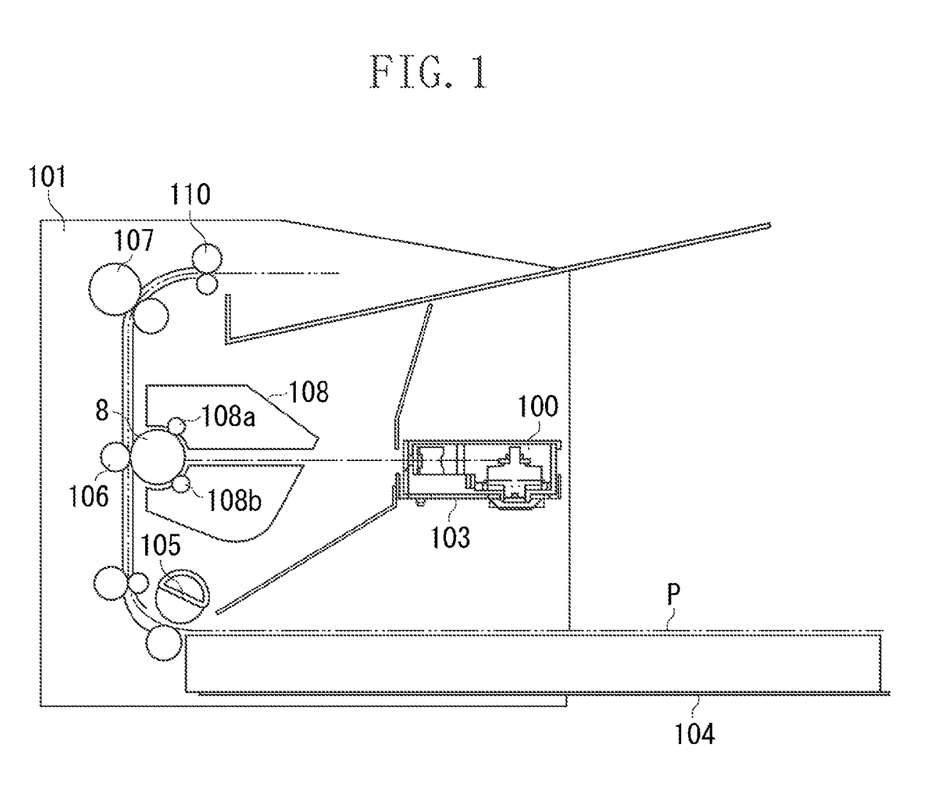
FIG. 1 is a schematic sectional view of an image forming apparatus.

FIG. 1 illustrates an image forming apparatus 101. An optical scanning device 100, which is described below, is mounted on an optical bench 103. The optical bench 103 is a part of the chassis of the image forming apparatus 101. The image forming apparatus 101 includes, among others, a process cartridge 108, which is an image forming unit, a paper feed unit 104, in which transfer material P is stacked, a paper feed roller 105, a transfer roller (a transfer unit) 106, and a fixing device (a fixing unit) 107. The process cartridge 108 includes a photosensitive drum (photosensitive member) 8, which serves as an image bearing member, a charging roller 108a, and a developing roller 108b. The transfer roller 106 and the photosensitive drum 8 are in contact with each other to form a transfer nip.

The surface of the photosensitive drum 8 is charged by the charging roller 108a while the photosensitive drum 8 is being rotated around the rotation shaft thereof. Then, the optical scanning device 100 radiates laser light for scanning onto the surface of the photosensitive drum 8 to form a latent image thereon. Then, the developing roller 108b causes toner to adhere to the latent image, thus forming a toner image, in which the latent image is developed with toner.

On the other hand, the transfer material P is fed from the paper feed unit 104 by the paper feed roller 105, so that the toner image formed on the photosensitive drum 8 is transferred to the transfer material P by the transfer roller 106. Then, the toner image on the transfer material P is fixed to the transfer material P with heat and pressure by the fixing device 107. The transfer material P with the toner image fixed thereto is output to the outside of the image forming apparatus 101 by a discharge roller pair 110.

[Optical Scanning Device]

Figure 2:
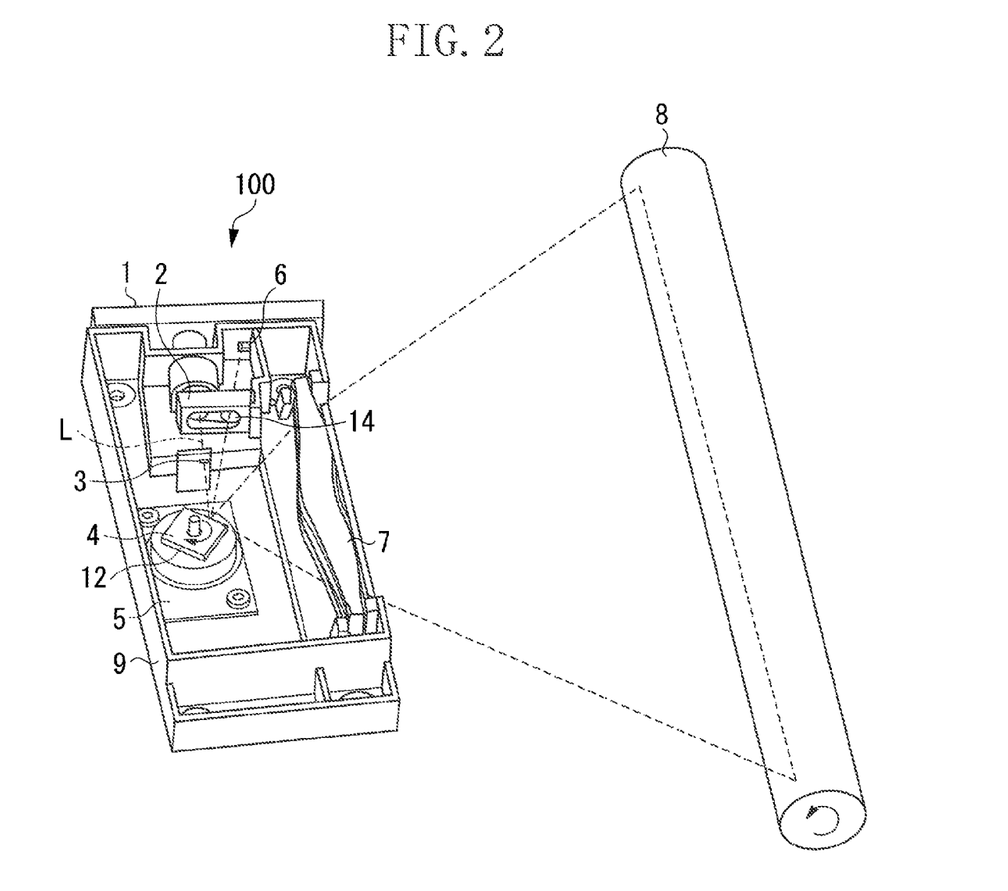
FIG. 2 is a schematic perspective view of an optical scanning device according to an exemplary embodiment.
Figure 3:
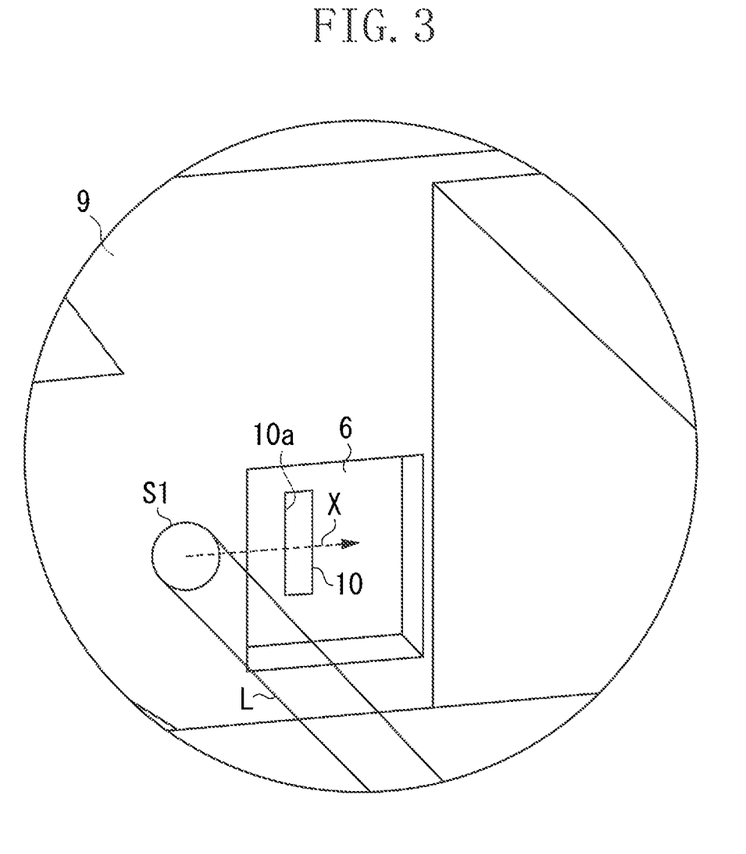
FIG. 3 is a partial perspective view illustrating the vicinity of a beam detection (BD) sensor in the optical scanning device.

Next, the optical scanning device 100 is described. FIG. 2 is a schematic perspective view of the optical scanning device 100. FIG. 3 is a partial perspective view illustrating the vicinity of a beam detection (BD) sensor 6 in the optical scanning device 100. A semiconductor laser unit 1 is the one obtained by unitizing a semiconductor laser (not illustrated), which emits a laser light beam L, and a drive circuit (not illustrated), which drives the semiconductor laser. The laser light beam L emitted from the semiconductor laser passes through a lens 2, which has the collimator lens function and the cylindrical lens function, and an aperture stop 3, and is then incident on one of a plurality of reflecting surfaces 12, which are formed on a rotary polygonal mirror (a polygon mirror) 4 included in a deflection unit 5. The polygon mirror 4 is driven by a motor included in the deflection unit 5 to be rotated in the direction of an arrow illustrated in FIG. 2. As the orientation of each of the reflecting surfaces 12 changes according to the rotation of the polygon mirror 4, the direction in which the laser light beam L is reflected from each reflecting surface 12 consecutively changes. In this way, the laser light beam L is deflected by the polygon mirror 4. When the polygon mirror 4 is at a certain rotational phase, the laser light beam L reflected from a corresponding one of the reflecting surface 12 passes through a BD lens 14 to be converged, and is then incident on a light receiving portion 10 (FIG. 3) included in the BD sensor 6, which serves as a light receiving member (a light receiving element). On the other hand, when the polygon mirror 4 is at another rotational phase, the laser light beam L enters an fθ lens (a scanning lens) 7, and is then incident on a photosensitive surface (a scanned surface), which is the surface of the photosensitive drum 8. The above-mentioned optical members (the semiconductor laser unit 1, the lens 2, the aperture stop 3, the deflection unit 5, the BD sensor 6, and the fθ lens 7) are positioned, supported, and fixed in position within an optical box 9.

[Scanning on Photosensitive Drum by Laser Light]

Next, a method for scanning the photosensitive drum 8 with laser light, which is performed by the optical scanning device 100, is described. The laser light beam L emitted from the semiconductor laser of the semiconductor laser unit 1 is converted by the lens 2 into approximately parallel light or converged light in the main scanning direction and into converged light in the sub scanning direction. Then, the laser light beam L passes through the aperture stop 3, by which the light beam width of the laser light beam L is limited, and is then focused on a corresponding reflecting surface 12 of the polygon mirror 4 in the form of a line extending long in the main scanning direction. Then, as the direction of reflection of the laser light beam L from the reflecting surface 12 consecutively changes according to the rotation of the polygon mirror 4, the laser light beam L is deflected. When the polygon mirror 4 is at a predetermined rotational phase, the reflected laser light beam L is incident on a portion of the optical box 9 near the BD sensor 6 or on the surface of the BD sensor 6, thus forming a circular spot S1 (FIG. 3). As the polygon mirror 4 rotates, the spot S1 of the laser light beam L moves in the direction of a dashed arrow illustrated in FIG. 3 (in the X direction), and then passes through the light receiving portion 10. At this time, the BD sensor 6 outputs a BD signal when the amount of light received at the light receiving portion 10 has reached a predetermined threshold value. With reference to timing at which the BD signal has been output, timing of start of light emission (start of writing of an image) performed by the light source based on image data is determined.

As the polygon mirror 4 further rotates a predetermined amount, the laser light beam L reflected from the polygon mirror 4 passes through the fθ lens 7, and is then incident on the surface of the photosensitive drum 8. The fθ lens 7 converges and focuses the laser light beam L as a spot image on the surface of the photosensitive drum 8. During a period in which the polygon mirror 4 further rotates a predetermined amount after the laser light beam L starts entering the fθ lens 7, the laser light beam L continues passing through the fθ lens 7 and being incident on the surface of the photosensitive drum 8, and the spot image of the laser light beam L moves on the surface of the photosensitive drum 8 in a scanning direction corresponding to the rotational direction of the polygon mirror 4. The scanning direction is parallel to the rotational axis direction of the photosensitive drum 8. The fθ lens 7 is designed in such a way as to cause the spot image of the laser light beam L to move at a constant speed in the scanning direction (the main scanning direction) on the surface of the photosensitive drum 8.

During a period in which the spot image of the laser light beam L moves in the scanning direction on the surface of the photosensitive drum 8, a driving current is supplied to the light source of the semiconductor laser unit 1 based on a laser driving signal (a video signal) corresponding to image data to be formed, so that the light source is turned on.

In addition to the above-mentioned rotation of the polygon mirror 4, as the photosensitive drum 8 rotates around the rotational shaft thereof, the spot image of the laser light beam L relatively moves in a direction perpendicular to the main scanning direction (in the sub scanning direction) with respect to the surface of the photosensitive drum 8. The rotation of the polygon mirror 4 and the rotation of the photosensitive drum 8 performed in the above-described way enable a two-dimensional latent image corresponding to image data to be formed on the surface of the photosensitive drum 8.

The output process for the BD signal and the scanning process with the laser light beam L on the photosensitive drum 8 described above are performed for every reflecting surface 12 according to the rotation of the polygon mirror 4.

Timing at which to output the BD signal is determined by the positional accuracy of a portion (a boundary portion) of the light receiving portion 10 on which the spot S1 of the laser light beam L is first incident when moving in the X direction. In the case of a conventional configuration, a BD sensor having a relatively large light receiving portion is used, and a restriction portion that covers a part of the light receiving portion on the upstream side in the X direction and that restricts a laser light beam incident on the part of the light receiving portion is formed with a member different from a circuit board. In such a configuration, since the end of the restriction portion serves as the above-mentioned boundary portion, the acceptable range of positional errors of the BD sensor is wide as long as the position of the restriction portion is precisely determined. However, if, as in the present exemplary embodiment, no restriction portion different from a circuit board is provided for the purpose of reduction in size and cost, an end 10a of the light receiving portion 10 on the upstream side in the X direction serves as the above-mentioned boundary portion. Therefore, it is necessary to form the end 10a in the form of a straight line perpendicular to the X direction and to precisely determine the position of the light receiving portion 10 in the X direction.

[Positioning of BD Sensor 6]

Figure 4A:
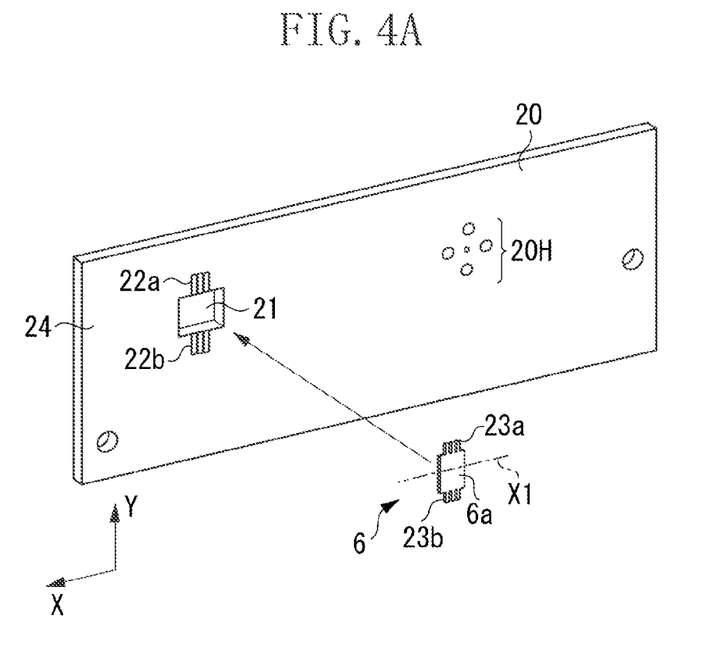
FIG. 4A is a perspective view illustrating a relationship between the BD sensor and a board, on which the BD sensor is to be mounted, in a condition in which the BD sensor is not yet mounted on the board.
Figure 4B:
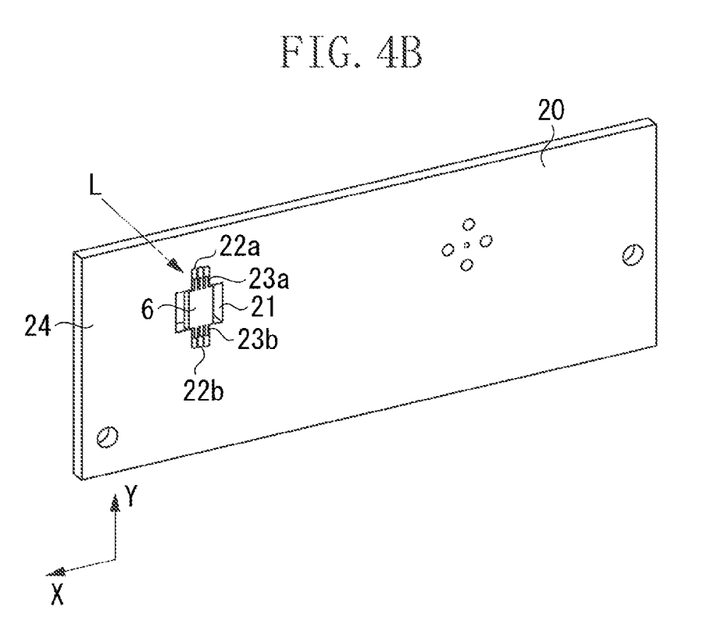
FIG. 4B is a perspective view illustrating a relationship between the BD sensor and the board, on which the BD sensor is to be mounted, in a condition in which the BD sensor has been mounted on the board.

FIGS. 4A and 4B are perspective views illustrating a relationship between the BD sensor 6 and a board (a circuit board) 20, on which the BD sensor 6 is to be mounted (fitted). FIG. 4A illustrates a condition in which the BD sensor 6 is not yet mounted on the board 20, and FIG. 4B illustrates a condition in which the BD sensor 6 has been mounted on the board 20. Suppose that the direction of movement (the scanning direction) of the spot S1 of the laser light beam L on the surface of the BD sensor 6 is the X direction and a direction perpendicular to the scanning direction X as viewed from a normal direction to a mounting surface 24 of the board 20 is the Y direction. Since the surface of the BD sensor 6 is parallel to the mounting surface 24 of the board 20, the X direction and the Y direction are parallel to the mounting surface 24. The laser light beam L is radiated on the reverse side (the back) of the mounting surface 24 from the far side toward the near side as viewed in FIG. 4B. The board has holes 20H formed thereon, in which terminals of the semiconductor laser of the semiconductor laser unit 1 are to be inserted. The terminals of the semiconductor laser are inserted into the holes 20H from the surface on the reverse side of the mounting surface 24 and are then connected by solder, at the mounting surface 24, to a laser driving control circuit formed on the mounting surface 24.

The BD sensor 6 includes a first terminal array (a first terminal portion) 23a and a second terminal array (a second terminal portion) 23b. Each of the first terminal array 23a and the second terminal array 23b includes a plurality of terminals arrayed in the X direction. The first terminal array 23a and the second terminal array 23b are arranged to protrude from a body portion 6a, having the light receiving portion 10, of the BD sensor 6 along the Y direction. The first terminal array 23a and the second terminal array 23b protrude from the body portion 6a in opposite directions along the Y direction, and are located opposite each other across the body portion 6a with respect to the Y direction. Furthermore, as viewed from a normal direction to the mounting surface 24, the first terminal array 23a and the second terminal array 23b are line-symmetric with respect to a central line X1 that passes thorough the center of the BD sensor 6 and is parallel to the X direction.

Since the semiconductor laser and the BD sensor 6 are mounted on the board 20, the board 20 is provided with a driving control circuit for the semiconductor laser and a BD signal output circuit. The board 20 has a hole 21, which is a through-hole, formed thereon. On the mounting surface 24, which is configured to mount electrical elements thereon, pads 22a and 22b electrically connected to the BD signal output circuit are arranged opposite each other across the hole 21 with respect to the Y direction. The pad 22a is a first soldering portion to be soldered to the first terminal array 23a, and the pad 22b is a second soldering portion to be soldered to the second terminal array 23b. When the first terminal array 23a and the second terminal array 23b are soldered to the pads 22a and 22b of the board 20, respectively, with at least a part of the body portion 6a of the BD sensor 6 inserted and fitted into the hole 21, the BD sensor 6 is mounted on the board 20. The pads 22a and 22b of the board 20 are arranged in such a manner as to be superposed on the first terminal array 23a and the second terminal array 23b, respectively, when the BD sensor 6 is fitted into the hole 21. Furthermore, the pads 22a and 22b are arranged in a shape that is longer at the fore end thereof along the Y direction than the first terminal array 23a and the second terminal array 23b. Cream solder is previously applied to the pads 22a and 22b. When the board 20 with the first terminal array 23a and the second terminal array 23b superposed on the pads 22a and 22b, respectively, is put through a reflow furnace (not illustrated), the BD sensor 6 is fixed by solder to the board 20.

When the board 20 is put through the reflow furnace, cream solder applied to the pads 22a and 22b is melted. Then, due to the surface tension of the melted cream solder, self-alignment occurs in which the BD sensor 6 is moved in the X direction in such a manner that the first terminal array 23a and the second terminal array 23b are superposed on the pads 22a and 22b, respectively. Owing to the self-alignment occurring due to the surface tension, even if the BD sensor 6 is deviated in the X direction, the BD sensor 6 is moved in the X direction to the central position of the pads 22a and 22b and is thus positioned. Furthermore, since the pads 22a and 22b are arranged in a shape that is one size longer along the Y direction than the first terminal array 23a and the second terminal array 23b, the surface tension of solder is increased, so that self-alignment can be more stabilized. The first terminal array 23a and the second terminal array 23b are respectively arranged at the two sides parallel to the X direction of the body portion 6a of the BD sensor 6 and are located line-symmetric with respect to the central line X1, which passes thorough the center of the BD sensor 6 and is parallel to the X direction. Therefore, a moment to rotate the BD sensor 6 on the surface of the board 20 is unlikely to occur, so that stable self-alignment can occur.

Furthermore, self-alignment is unlikely to occur with respect to the Y direction. Therefore, the position of the BD sensor 6 in the Y direction is determined by restricting, with the hole 21, the positions of two sides parallel to the X direction of the BD sensor 6 and fitting the BD sensor 6 itself into the hole 21.

With the above-described configuration, the BD sensor 6 is precisely mounted at the positions of the pads 22a and 22b of the board 20 with respect to the X direction. Since the X direction is a direction in which a laser light beam is thrown for scanning on the BD sensor 6, mounting the BD sensor 6 in a precise position enables precisely determining timing of output of a BD signal and timing of writing start of an image.

Moreover, although a direction perpendicular to the scanning direction X as viewed from a normal direction to the mounting surface 24 of the board 20 has been mentioned as the Y direction, the Y direction may be an intersection direction that intersects with the scanning direction X as viewed from a normal direction to the mounting surface 24 of the board 20.

In a second exemplary embodiment, a more adaptable shape of the hole 21 of the board 20 is described. The configurations of the image forming apparatus 101 and the optical scanning device 100 in the second exemplary embodiment are similar to those of the first exemplary embodiment. Therefore, portions similar to those of the first exemplary embodiment are assigned the respective same reference numerals and are not described again here.

Figure 5A:
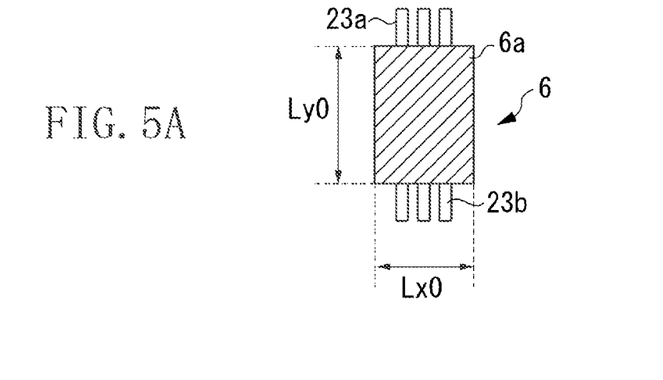
FIG. 5A illustrates the BD sensor.
Figure 5B:
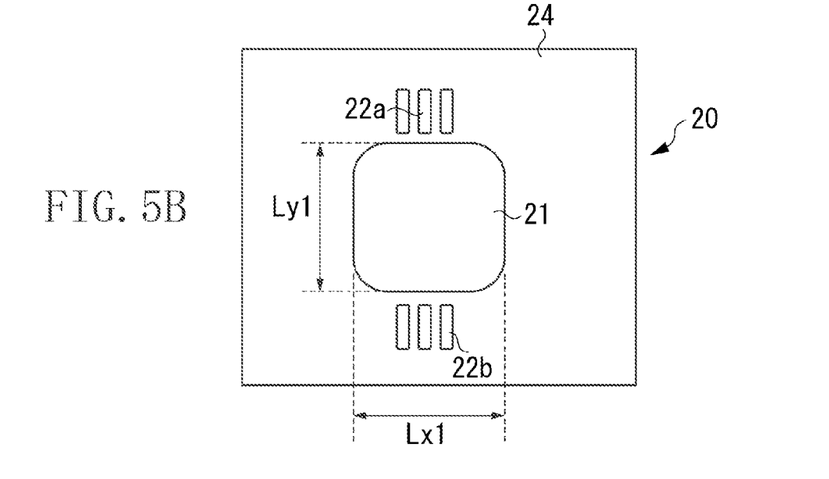
FIG. 5B illustrates the board.
Figure 5C:
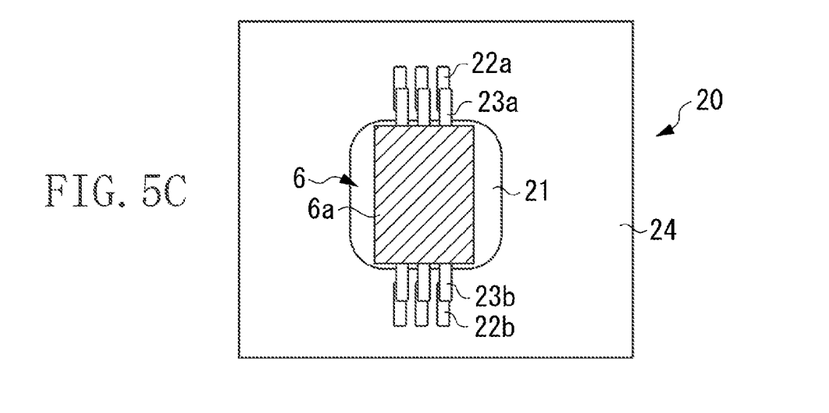
FIG. 5C illustrates the board having the BD sensor mounted thereon.

FIG. 5A illustrates the BD sensor 6, FIG. 5B illustrates the board 20, and FIG. 5C illustrates a state in which the BD sensor 6 has been mounted on the board 20, each as viewed from a normal direction to the mounting surface 24 of the board 20. As illustrated in FIG. 5A, suppose that the dimension in the X direction of the outline of the body portion 6a excluding the first terminal array 23a and the second terminal array 23b of the BD sensor 6 is denoted by Lx0, and that dimension in the Y direction is denoted by Ly0. As illustrated in FIG. 5B, the dimension in the X direction of the hole 21 of the board 20, in which to fit the body portion 6a of the BD sensor 6, is denoted by Lx1, and that dimension in the Y direction is denoted by Ly1.

As described in the first exemplary embodiment, while the BD sensor 6 can be positioned to the board 20 by self-alignment with respect to the X direction, the BD sensor 6 cannot be positioned by self-alignment with respect to the Y direction. Therefore, with respect to the Y direction, the board 20 is required to be positioned to the board 20 by fitting.

Furthermore, considering the workability of the board 20, the angles of four corners of the hole 21 of the board 20 cannot be formed into perfect right angles. Usually, the angles of four corners of the hole 21 each have a rounded portion (R) with a radius r of 0.5 mm or more. Therefore, in a case where gaps between the BD sensor 6 and the hole 21 are to be equally provided both in the X direction and in the Y direction, it is necessary to make the size of the hole 21 0.5 mm or more larger than the size of the BD sensor 6 both in the X direction and in the Y direction, so as to prevent the rounded portions R at four corners from interfering with the corners of the BD sensor 6. Furthermore, since, considering the dimensional tolerance of the hole 21 or the body portion 6a itself, it is necessary to additionally provide gaps with a dimension of about 0.2 mm, the size of the hole 21 is required to be set to a size that is 0.7 mm or more larger than the size of the body portion 6a both in the X direction and in the Y direction. Therefore, the tolerance of positional deviation becomes up to 0.7 mm both in the X direction and in the Y direction. However, in the case of the BD sensor 6, the mounting positional deviation of 0.7 mm may not be acceptable to ensure the image quality in the image forming apparatus 101.

Therefore, according to the present exemplary embodiment, the gaps between the BD sensor 6 and the hole 21 are intentionally set to have different sizes between the X direction and the Y direction. More specifically, the dimension Lx1 of the hole 21 in the X direction, with respect to which the positioning action by self-alignment is expected, is set to a size 1.0 mm or more larger than the outline dimension Lx0 of the body portion 6a. Accordingly, even if the dimension Ly1 of the hole 21 in the Y direction is equal to the outline dimension Ly0 of the body portion 6, the rounded portions R of four corners of the hole 21 and the body portion 6a have such a relationship as not to interfere with each other. In the present exemplary embodiment, in consideration of the tolerance of the size of the hole 21 itself, additional gaps with a dimension of about 0.2 mm are provided both in the X direction and in the Y direction. Accordingly, the size of the hole 21 is set 1.2 mm larger in the X direction and 0.2 mm larger in the Y direction than the size of the BD sensor 6. As described in the foregoing, with regard to the X direction, since, when cream solder is melted, self-alignment in the X direction occurs in such a manner that the first terminal array 23a and the second terminal array 23b are superposed on the pads 22a and 22b, respectively, the mounting position is precisely determined even if the dimension of the hole 21 is relatively large. Thus, self-alignment enables precise mounting with an error of 0.1 mm or less with respect to a predetermined position. With regard to the Y direction, since the dimension of the gap between the BD sensor 6 and the hole 21 is no larger than 0.2 mm, the mounting position is determined with a tolerance of 0.2 mm or less.

In this way, according to the present exemplary embodiment, the relationship between the outline dimension of the body portion 6a and the dimension of the hole 21 on the board 20 is set to satisfy the following formula (1):

$$(Lx1-Lx0) \geq (Ly1-Ly0) \quad (1)$$

Thus, with regard to gaps between the body portion 6a and the hole 21, the gap "Ly1−Ly0" in the Y direction is set smaller than the gap "Lx1−Lx0" in the X direction.

With such a dimensional relationship, the BD sensor 6 can be precisely positioned to the board 20 by fitting also in the Y direction.

Furthermore, since, in the present exemplary embodiment, the mounting position of a mounted component can be precisely determined, the present exemplary embodiment can be applied to a light receiving member, such as the BD sensor 6, equipped with a light receiving portion or a light emitting member, such as a light emitting diode (LED), equipped with a light emitting portion, which needs high positional accuracy. However, the configuration of the present exemplary embodiment is not limited to such a light receiving member or light emitting member, but may be applied to positioning of an electrical element to be surface-mounted on a board.

In a third exemplary embodiment, another more adaptable shape of the hole 21 of the board 20 is described. The configurations of the image forming apparatus 101 and the optical scanning device 100 in the third exemplary embodiment are similar to those of the first exemplary embodiment. Therefore, portions similar to those of the first exemplary embodiment and the second exemplary embodiment are assigned the respective same reference numerals and are not described again here.

Figure 6A:
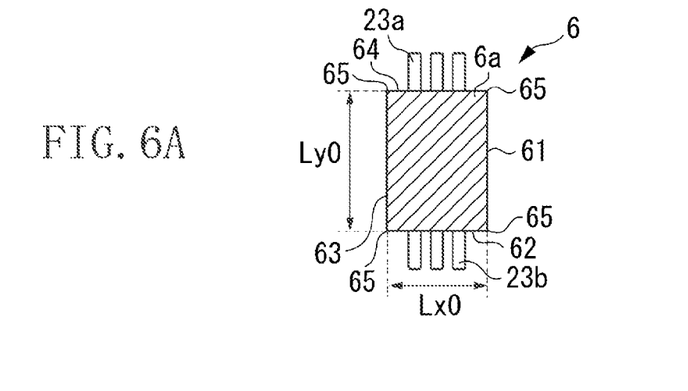
FIG. 6A illustrates the BD sensor.
Figure 6B:
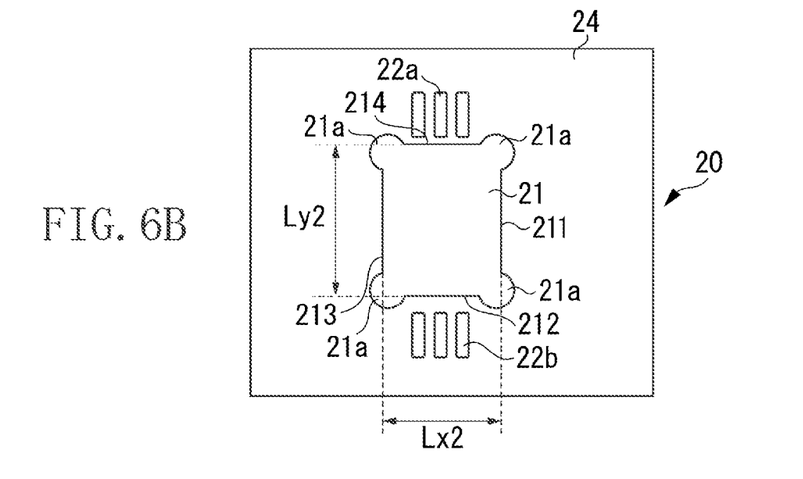
FIG. 6B illustrates a board.
Figure 6C:
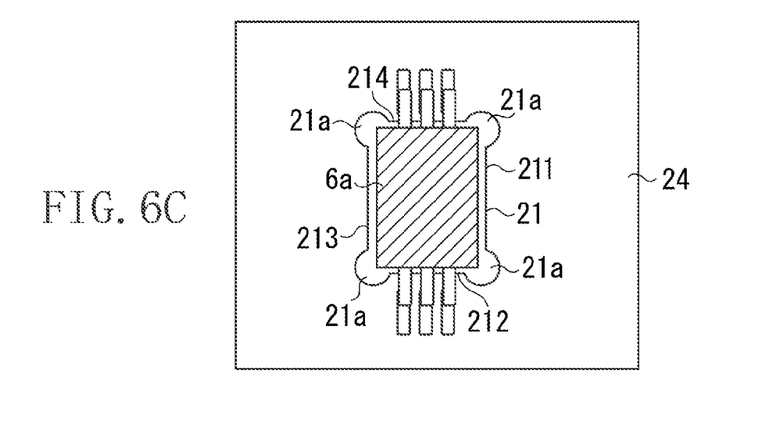
FIG. 6C illustrates the board having the BD sensor mounted thereon.

FIG. 6A illustrates the BD sensor 6, FIG. 6B illustrates the board 20, and FIG. 6C illustrates a state in which the BD sensor 6 has been mounted on the board 20, each as viewed from a normal direction to the mounting surface 24 of the board 20. As illustrated in FIG. 6B, the dimension in the X direction of the hole 21 of the board 20, in which to fit the body portion 6a of the BD sensor 6, is denoted by Lx2, and that dimension in the Y direction is denoted by Ly2.

The present exemplary embodiment is characterized by providing cut portions 21a at the four corners (four vertex portions) of the quadrangular hole 21 of the board 20. As described in the second exemplary embodiment, considering the workability of the board 20, the vertices of four corners of the hole 21 of the board 20 cannot be formed into perfect right angles. Therefore, in the present exemplary embodiment, the cut portions 21a are provided at the four corner portions of the hole 21, so that the hole 21 is enlarged. More specifically, as viewed from a normal direction to the mounting surface 24, the body portion 6a of the BD sensor 6 is of an approximately quadrangular shape having four sides 61, 62, 63, and 64 and four corner portions 65, at which the respective two adjacent sides of the four sides meet. The sides 62 and 64 are parallel to the X direction, and the sides 61 and 63 are parallel to the Y direction. Moreover, the hole 21 has four sides 211, 212, 213, and 214, which respectively face the four sides 61 to 64 of the body portion 6a, and four cut portions 21a, which are located at the positions respectively facing the four corner portions 65. Owing to the provision of the cut portions 21a, the edges of the cut portions 21a are further away from the four sides 61 to 64 and the four corner portions 65 of the body portion 6a than the four sides 211 to 214.

In this way, providing the cut portions 21a at the respective four corners enables preventing the body portion 6a from being affected by rounded portions R which might be formed at the vertices of four corners of the hole 21, and also enables designing the dimension Lx2 in the X direction of the hole 21 with a smaller dimension as compared with that in the second exemplary embodiment. Therefore, the area occupied by the hole 21 on the board 20 can be reduced, so that the degree of freedom of designing, such as layout, of the board 20 can be improved. more specifically, in consideration of the tolerance of the size of the hole 21 itself, gaps with a dimension of about 0.2 mm added to the size of the hole 21 in the X direction and the Y direction can be provided with respect to the outline size of the body portion 6a. Since self-alignment occurs in the X direction, the BD sensor 6 can be mounted almost with an error of 0.1 mm or less relative to a predetermined position. With regard to the Y direction, since the dimension of the gap between the BD sensor 6 and the hole 21 is no larger than 0.2 mm, the mounting position is determined with a tolerance of 0.2 mm or less.

With the above-described configuration, the BD sensor 6 can be precisely positioned by self-alignment with respect to the X direction and can also be precisely positioned relative to the board 20 by fitting with respect to the Y direction. Furthermore, since the cut portions 21a are provided at the respective four corner portions of the hole 21, the dimension Lx2 in the X direction of the hole 21 can be reduced, so that the area occupied by the hole 21 on the board 20 can be reduced and the degree of freedom of designing, such as layout, of the board 20 can be increased.

Moreover, since, in the present exemplary embodiment, the mounting position of a mounted component can be precisely determined, the present exemplary embodiment can be applied to a light receiving member, such as the BD sensor 6, equipped with a light receiving portion or a light emitting member, such as a light emitting diode (LED), equipped with a light emitting portion, which needs high positional accuracy. However, the configuration of the present exemplary embodiment is not limited to such a light receiving member or light emitting member, but may be applied to positioning of an electrical element to be surface-mounted on a board.

In a fourth exemplary embodiment, yet another more adaptable shape of the hole 21 of the board 20 is described. The configurations of the image forming apparatus 101 and the optical scanning device 100 in the fourth exemplary embodiment are similar to those of the first exemplary embodiment. Therefore, portions similar to those of the first exemplary embodiment and the other exemplary embodiments are assigned the respective same reference numerals and are not described again here.

Figure 7A:
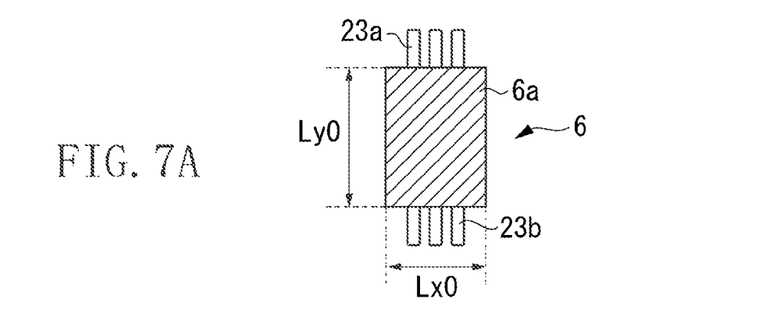
FIG. 7A illustrates the BD sensor.
Figure 7B:
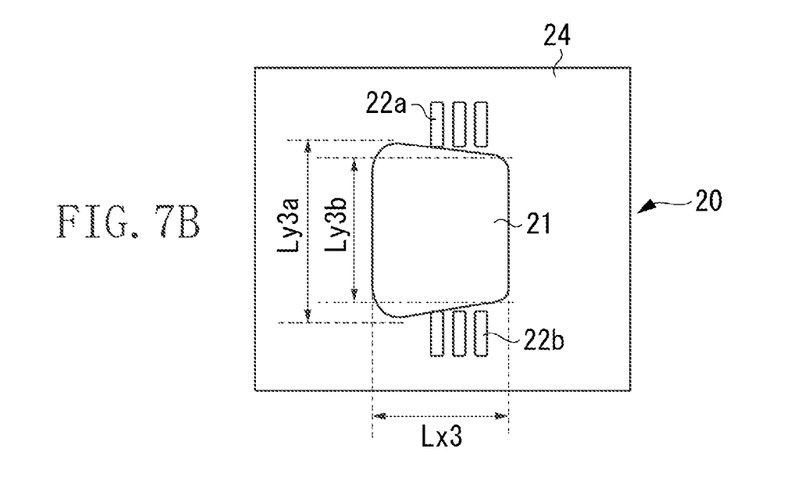
FIG. 7B illustrates a board.
Figure 7C:
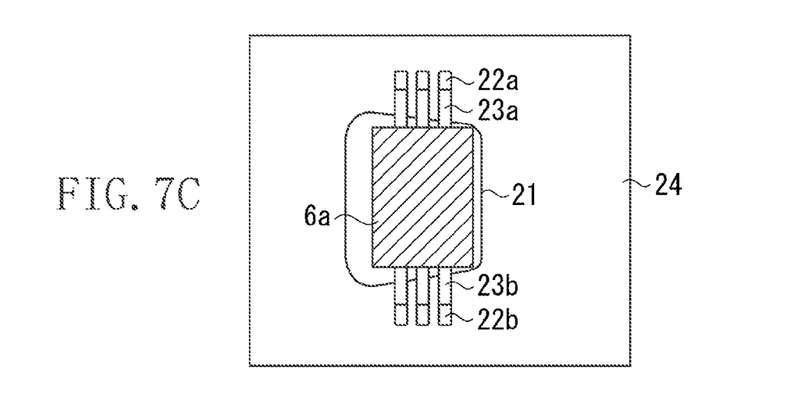
FIG. 7C illustrates the board having the BD sensor mounted thereon.

FIG. 7A illustrates the BD sensor 6, FIG. 7B illustrates the board 20, and FIG. 7C illustrates a state in which the BD sensor 6 has been mounted on the board 20, each as viewed from a normal direction to the mounting surface 24 of the board 20. As illustrated in FIG. 7B, the dimension in the X direction of the hole 21 of the board 20, in which to fit the BD sensor 6, is denoted by Lx3, and the largest dimension and the smallest dimension in the Y direction of the hole 21 of the board 20 are denoted by Ly3a and Ly3b, respectively.

In the present exemplary embodiment, the relationship between the outline dimension of the body portion 6a and the dimension of the hole 21 on the board 20 is set to satisfy "Lx3≥Lx0" and "Ly3a>Ly3b≥Ly0". In this way, the hole 21 is of a shape having different lengths in the Y direction depending on the position in the X direction.

At the time of reflow mounting, the BD sensor 6 moves in the X direction toward the adjusted position, such as that illustrated in FIG. 7C, in which the first terminal array 23a and the second terminal array 23b are superposed on the pads 22a and 22b, respectively, by self-alignment due to the surface tension of solder. Therefore, in the present exemplary embodiment, when the BD sensor 6 moves in the X direction toward the adjusted position by self-alignment, the width in the Y direction of the hole 21 becomes gradually narrower. The length Ly3b at the position where the width in the Y direction of the hole 21 is smallest is approximately equal to the dimension Ly0. Therefore, the position of the BD sensor 6 in the Y direction is restricted along with the movement in the X direction by self-alignment, so that the position in the Y direction of the BD sensor 6 can also be precisely determined.

In this way, in the present exemplary embodiment, a difference is set in the dimension of the hole 21 in the Y direction between the position where the BD sensor 6 is fitted (inserted into the hole 21) and the adjusted position where the BD sensor 6 is positioned by self-alignment. This enables designing, with a minimum numerical value, the dimension in the Y direction of the hole 21 at the position where the BD sensor 6 is fixed by solder while assuring the ease of fitting (ease of mounting) during the fitting of the BD sensor 6 into the hole 21, so that the BD sensor 6 can be precisely mounted. For example, when the dimension of the gap (Ly3b−Ly0) in the Y direction at the adjusted position is set to 0.1 mm, since the BD sensor 6 bumps into the hole 21 to determine the position thereof, a mounting error in the Y direction can be kept to 0.1 mm.

The above-described configuration enables, while assuring the ease of fitting (ease of mounting) during the fitting of the BD sensor 6 into the hole 21, precisely positioning the BD sensor 6 by self-alignment with respect to the X direction and also precisely positioning the BD sensor 6 by fitting to the board with respect to the Y direction using the movement in the X direction by self-alignment.

Moreover, since, in the present exemplary embodiment, the mounting position of a mounted component can be precisely determined, the present exemplary embodiment can be applied to a light receiving member, such as the BD sensor 6, equipped with a light receiving portion or a light emitting member, such as a light emitting diode (LED), equipped with a light emitting portion, which needs high positional accuracy. However, the configuration of the present exemplary embodiment is not limited to such a light receiving member or light emitting member, but may be applied to positioning of an electrical element to be surface-mounted on a board.

Figure 8:
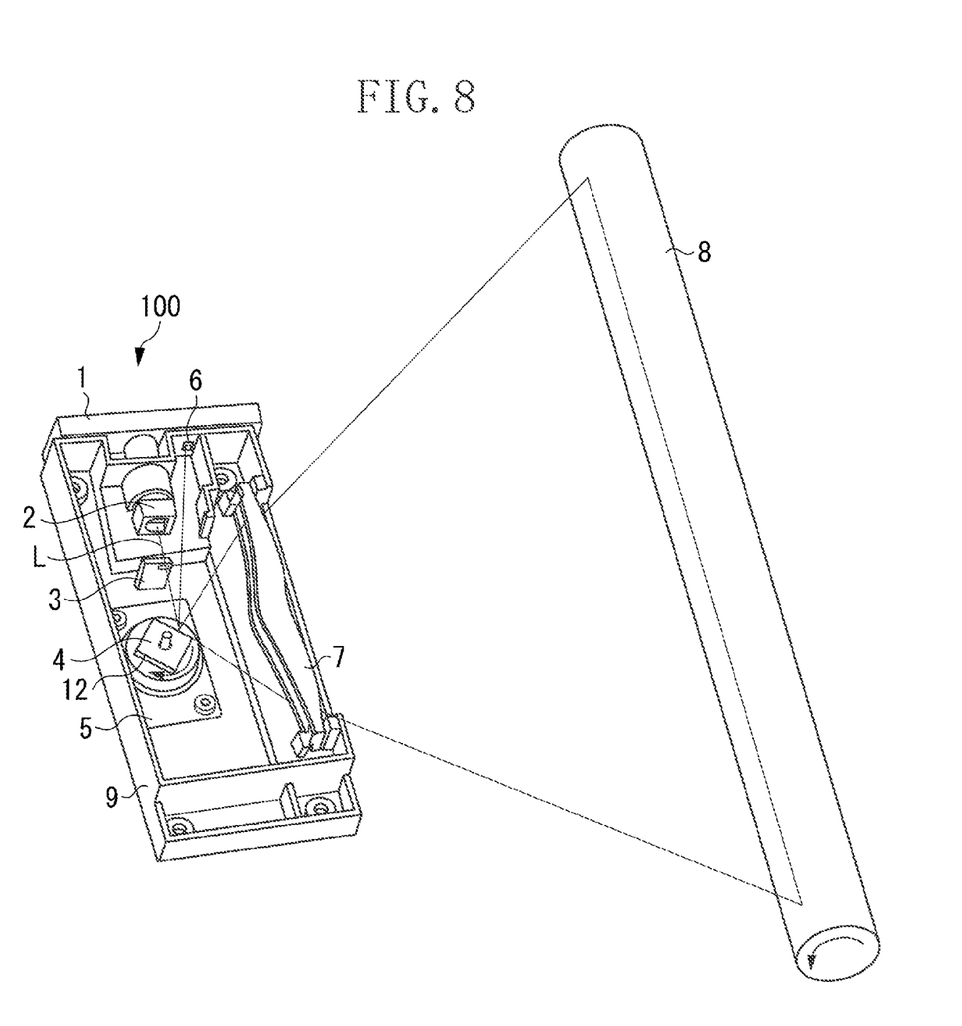
FIG. 8 is a schematic perspective view of an optical scanning device according to another exemplary embodiment.

FIG. 8 is a schematic perspective view of an optical scanning device 100 according to a fifth exemplary embodiment. The fifth exemplary embodiment differs from the first to fourth exemplary embodiments in that the optical scanning device 100 includes no BD lens 14. When the polygon mirror 4 is at a certain rotational phase, the laser light beam L reflected from a corresponding one of the reflecting surfaces 12 is incident on a light receiving portion of the BD sensor 6 without passing through any lens or the like. The above-described first to fourth exemplary embodiments can also be applied to such an optical scanning device 100.

Next, as a sixth exemplary embodiment, an example is described in which a false detection by the BD sensor 6 caused by a laser light beam reflected from the inner wall surface of a through-hole, which is formed on a board and in which the BD sensor 6 is mounted, incident on the light receiving portion 10 of the BD sensor 6 can be prevented.

[Positioning of BD Sensor 6]

Figure 9A:
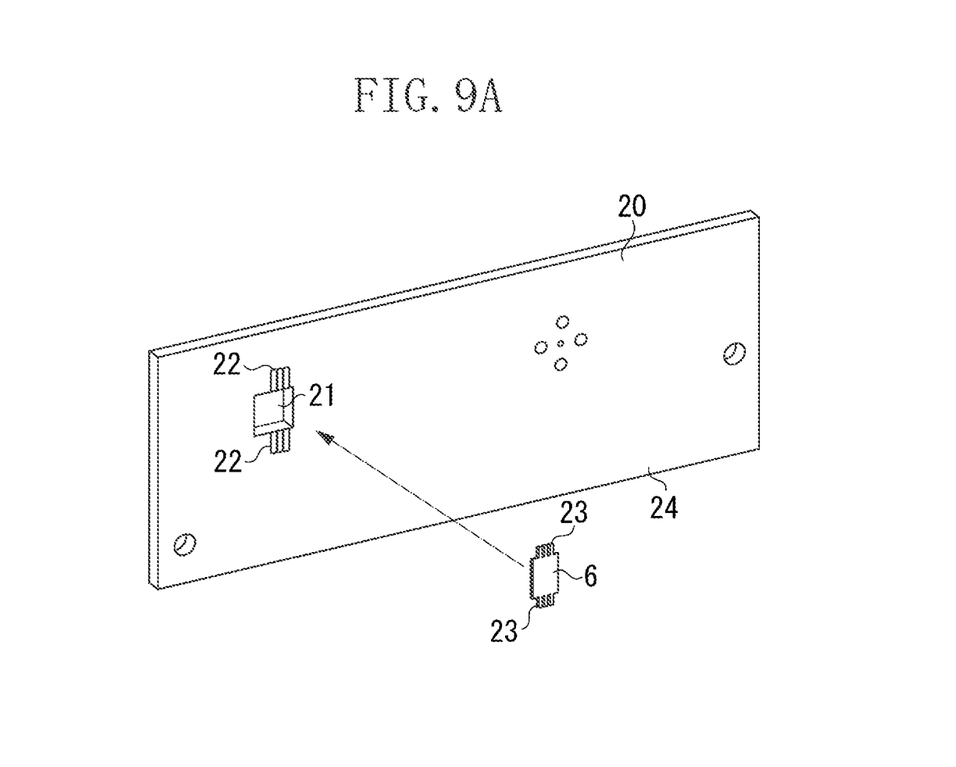
FIG. 9A is a perspective view illustrating a relationship between the BD sensor and a board, on which the BD sensor is to be mounted, in a condition in which the BD sensor is not yet mounted on the board.
Figure 9B:
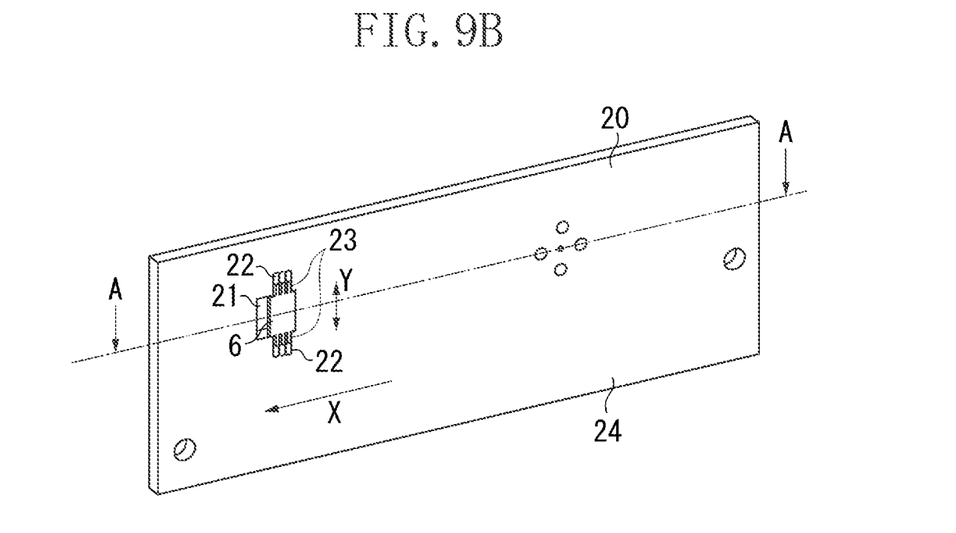
FIG. 9B is a perspective view illustrating a relationship between the BD sensor and the board, on which the BD sensor is to be mounted, in a condition in which the BD sensor has been mounted on the board.

FIGS. 9A and 9B are perspective views illustrating a relationship between the BD sensor 6 and the board 20, on which the BD sensor 6 is to be mounted (fitted). FIG. 9A illustrates a condition in which the BD sensor 6 is not yet mounted on the board 20, and FIG. 9B illustrates a condition in which the BD sensor 6 has been mounted on the board 20. Suppose that the direction of movement (the scanning direction) of the spot S1 of the laser light beam L on the surface of the BD sensor 6 is the X direction and a direction perpendicular to the scanning direction X as viewed from a normal direction to the mounting surface 24 of the board 20 is the Y direction.

As described in the first exemplary embodiment, since the semiconductor laser and the BD sensor 6 are mounted on the board 20, the board 20 is provided with a driving control circuit for the semiconductor laser and a BD signal output circuit. The board 20 has a hole 21, which is a through-hole, formed thereon. Terminal arrays 23 of the BD sensor 6 are soldered to pads 22 of the board 20, so that the BD sensor 6 is mounted on the board 20. The terminal arrays 23 may be soldered to the pads 22 with at least a part of the BD sensor 6 inserted and fitted into the hole 21. The pads 22 of the board 20 are arranged in such a manner that the terminal arrays 23 are superposed on the pads 22 when the BD sensor 6 is fitted in the hole 21. Furthermore, the pads 22 are arranged in a shape that is longer at the fore end thereof along the Y direction than the terminal arrays 23. Cream solder is previously applied to the pads 22. When the board 20 with the terminal arrays 23 superposed on the pads 22 is put through a reflow furnace, the BD sensor 6 is fixed by solder to the board 20.

When the board 20 is put through the reflow furnace, cream solder applied to the pads 22 is melted. Then, due to the surface tension of the melted cream solder, self-alignment occurs in which the BD sensor 6 is moved in the X direction in such a manner that the terminal arrays 23 are superposed on the pads 22. Owing to the self-alignment occurring due to the surface tension, even if the BD sensor 6 is deviated in the X direction, the BD sensor 6 is moved in the X direction to the central position of the pads 22 and is thus positioned. Furthermore, since the pad 22 are arranged in a shape that is one size longer along the Y direction than the terminal arrays 23, the surface tension of solder is increased, so that self-alignment can be more stabilized. The terminal arrays 23 are arranged at the two sides parallel to the X direction of the BD sensor 6 and are located line-symmetric with respect to a central line which passes thorough the center of the BD sensor 6 and is parallel to the X direction. Therefore, a moment to rotate the BD sensor 6 on the surface of the board 20 is unlikely to occur, so that stable self-alignment can occur.

With the above-described configuration, the BD sensor 6 is precisely mounted at the positions of the pads 22 of the board 20 with respect to the X direction. Since the X direction is a direction in which a laser light beam is thrown for scanning on the BD sensor 6, mounting the BD sensor 6 in a precise position enables precisely determining timing of output of a BD signal and timing of writing start of an image. Furthermore, self-alignment is unlikely to occur with respect to the Y direction. Therefore, the position of the BD sensor 6 in the Y direction is determined by restricting, with the hole 21, the positions of two sides parallel to the X direction of the BD sensor 6 and fitting the BD sensor 6 itself into the hole 21.

[Prevention of Stray Light to BD Sensor 6]

Figure 10:
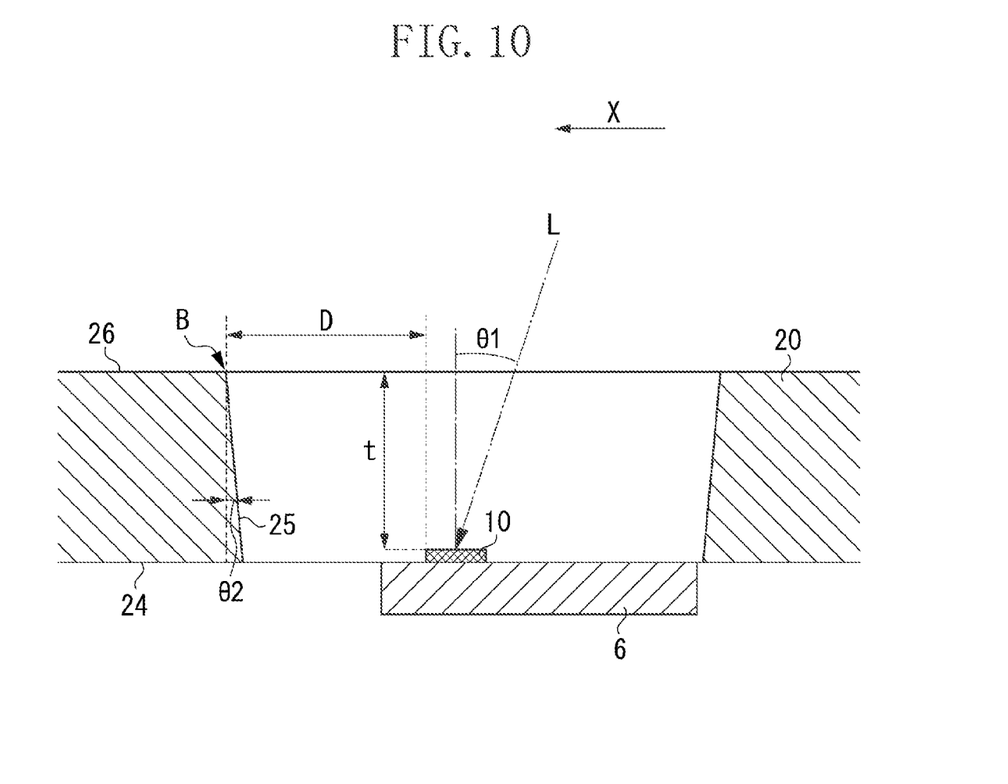
FIG. 10 is a sectional view, taken along a scanning direction, illustrating a laser light beam L that is incident on the BD sensor.

FIG. 10 illustrates a laser light beam L that is incident on the BD sensor 6 in a sectional view taken along line A-A illustrated in FIG. 9B serving as a scanning line corresponding to the laser light beam L deflected by the polygon mirror 4, as viewed from above. As described in the foregoing, since the BD sensor 6 is mounted on the mounting surface 24 of the board 20, on which a semiconductor laser is mounted, the laser light beam L is incident on the mounting surface 24 at an angle of θ1 to a normal direction to the light receiving portion 10, which is a light receiving surface parallel to the mounting surface 24. Since the hole 21 of the board 20 is formed by press working with a die from the side of the mounting surface 24, the inner wall surface of the hole 21 is formed to have an inclination of angle θ2 with respect to a normal direction to the mounting surface 24.

The laser light beam L moves for scanning in the X direction (from right to left in FIG. 10), and the hole 21 is widely open at the side through which the laser light beam L passes after passing through the light receiving portion 10 (at the downstream side in the X direction of the light receiving portion 10). The magnitude of a portion of the hole 21 at the downstream side in the X direction of the light receiving portion 10 is described. Supposing that a portion at the most downstream side in the scanning direction of the inner wall surface of the hole 21 is referred to as an end face 25, light reflected from the end face 25 after the laser light beam L passes through the light receiving portion 10 may be incident on the light receiving portion 10, and the BD sensor 6 may output a BD signal based on the light received by the light receiving portion 10. In particular, since the light receiving portion 10 in the present exemplary embodiment is located at the more downstream side in the X direction than the center of the BD sensor 6 and is thus near the end face 25, light reflected from the end face 25 is likely to be incident on the light receiving portion 10. To prevent such a false detection by the BD sensor 6, the hole 21 is formed in such a shape as to prevent light reflected from the end face 25 from being incident on the light receiving portion 10.

A point closest to the polygon mirror 4 on the end face 25 is referred to as point B. The point B is a reflecting point from which the reflected laser light beam L passes in a direction most toward the light receiving portion 10. Furthermore, the length of a perpendicular line drawn from the light receiving portion 10 to a back side 26 of the board 20, which is a plane containing the point B and parallel to the mounting surface 24, is referred to as "t".

Figure 11:
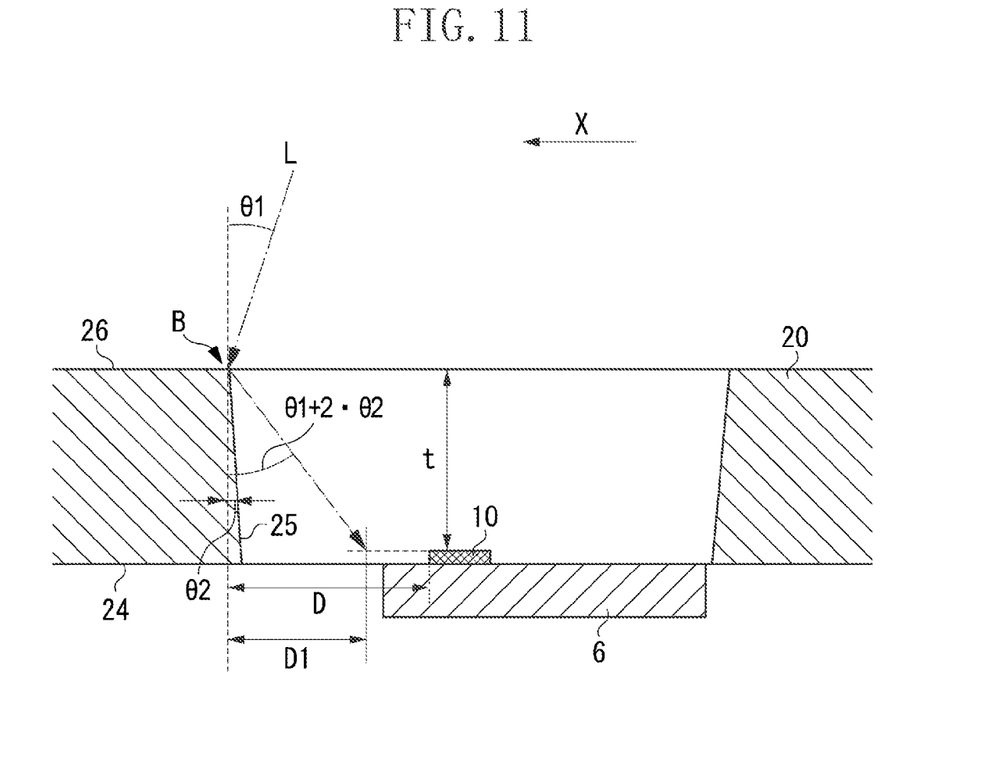
FIG. 11 is a sectional view, taken along the scanning direction, illustrating a laser light beam L that is reflected from a point B.

FIG. 11 illustrates a laser light beam L being reflected from the point B in a sectional view taken along line A-A illustrated in FIG. 9B serving as a scanning line corresponding to the laser light beam L deflected by the polygon mirror 4, as viewed from above, as with FIG. 10. Similar to a light beam incident on the light receiving portion 10, a laser beam incident on the point B at an angle of incidence of θ1 relative to the perpendicular direction of the light receiving portion 10 is reflected from the point B at an angle of "θ1+2·θ2" in consideration of the angle θ2 of the inner wall surface of the hole 21. Therefore, a distance D1 with respect to the X direction from the point B to a point at which the laser beam reflected from the point B reaches the same height as that of the light receiving portion 10 is obtained as "t·tan (θ1+2·θ2)".

Accordingly, if a distance between the light receiving portion 10 and the point B with respect to the X direction satisfies the following formula (2), a laser beam reflected from the point B is not incident on the light receiving portion 10.

$$D > t \cdot \tan(\theta 1 + 2 \cdot \theta 2) \quad (2)$$

When the angle of the light beam reflected from the point B with respect to a direction perpendicular to the X direction is denoted by θ (=θ1+2·θ2), formula (2) can be substituted with the following formula (2)'.

$$D > t \cdot \tan \theta \quad (2)'$$

In this way, if the distance D satisfies formula (2), since the laser light beam L reflected from the point B is not incident on the light receiving portion 10, no laser light beam L reflected from the end face 25 of the hole 21 of the board 20 is incident on the light receiving portion 10. In the present exemplary embodiment, the position of the BD sensor 6 in the X direction is set to such a position that the distance D satisfies formula (2). This enables preventing light reflected from the inner wall surface of the hole 21 from being incident on the light receiving portion 10 of the BD sensor 6.

A seventh exemplary embodiment differs from the sixth exemplary embodiment in that the optical scanning device 100 includes no BD lens 14, as with the configuration described in the fifth exemplary embodiment. When the polygon mirror 4 is at a certain rotational phase, the laser light beam L reflected from a corresponding one of the reflecting surfaces 12 is incident on a light receiving portion of the BD sensor 6 without passing through any lens or the like. In the case of the present exemplary embodiment, in which no BD lens 14 is included, the spot S1 of the laser light beam L in the position of the BD sensor 6 is larger than that in the configuration of the first exemplary embodiment in which the BD lens 14 is included. Therefore, if the laser light beam L is reflected from the inner wall surface of the hole 21 and is then incident on the light receiving portion 10, the laser light beam L may be detected by the BD sensor 6 as a relatively large amount of light. Accordingly, such a configuration as to satisfy equation (2) is more effective.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-028944 filed Feb. 17, 2015 and No. 2015-028945 filed Feb. 17, 2015, which are hereby incorporated by reference herein in their entirety.

What is claimed is:

1. An optical scanning device comprising:
   a light source;
   a deflection unit configured to deflect a light beam emitted from the light source;
   a board; and
   a light receiving member including a body portion, which includes a light receiving portion, and a first terminal portion and a second terminal portion, each of which is soldered to the board,
   wherein the light receiving portion receives the light beam deflected by the deflection unit and moving in a scanning direction,
   wherein the first terminal portion and the second terminal portion are located opposite each other across the body portion in an intersection direction that intersects with the scanning direction as viewed in a normal direction to a mounting surface of the board,
   wherein the board has a through-hole formed thereon, into which at least a part of the body portion is inserted, and includes a first soldering portion soldered to the first terminal portion and a second soldering portion soldered to the second terminal portion, the first soldering portion and the second soldering portion being located opposite each other across the through-hole in the intersection direction, and
   wherein, when a length in the scanning direction and a length in the intersection direction of the body portion are denoted by Lx0 and Ly0, respectively, and a length in the scanning direction and a length in the intersection direction of the through-hole are denoted by Lx1 and Ly1, respectively, the lengths Lx0, Ly0, Lx1, and Ly1 satisfy the following formula:

$$(Lx1-Lx0) > (Ly1-Ly0).$$

2. The optical scanning device according to claim 1, wherein each of the first terminal portion and the second terminal portion includes a plurality of terminals arrayed in the scanning direction.

3. The optical scanning device according to claim 2, wherein, as viewed from a normal direction to a mounting surface of the board, the plurality of terminals of the first terminal portion and the plurality of terminals of the second terminal portion are located line-symmetric with respect to a line that passes through the center of the light receiving member and is parallel to the scanning direction.

4. The optical scanning device according to claim 1, wherein, as viewed from a normal direction to a mounting surface of the board, the body portion is of an approximately quadrangular shape having four sides and four corner portions, the through-hole has four sides, which respectively face the four sides of the body portion, and four cut portions, which are located at positions respectively facing the four corner portions, and edges of the cut portions are further away from the body portion than the four sides of the through-hole.

5. The optical scanning device according to claim 1, wherein, when a position where the body portion is positioned in an X direction is set as an adjusted position, as viewed from a normal direction to a mounting surface of the board, the through-hole narrows in width in the intersection direction toward the adjusted position with respect to the X direction.

6. The optical scanning device according to claim 1, wherein the intersection direction is a direction perpendicular to the scanning direction as viewed from a normal direction to a mounting surface of the board.

7. The optical scanning device according to claim 1, wherein the light receiving portion outputs a signal based on receiving the light beam, and the light source emits a light beam based on timing at which the signal has been output.

8. The optical scanning device according to claim 1, wherein the deflection unit includes a reflecting surface and deflects the light beam by continuously changing a direction in which to reflect the light beam with the reflecting surface, and the light beam reflected from the reflecting surface is incident on the light receiving portion without passing through any lens.

* * * * *